(12) United States Patent
Bettinger et al.

(10) Patent No.: US 9,928,968 B2
(45) Date of Patent: Mar. 27, 2018

(54) MELANINS AS ACTIVE COMPONENTS IN ENERGY STORAGE MATERIALS

(71) Applicant: Carnegie Mellon University, Pittsburgh, PA (US)

(72) Inventors: Christopher J. Bettinger, Pittsburgh, PA (US); Jay F. Whitacre, Pittsburgh, PA (US); Young Jo Kim, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 217 days.

(21) Appl. No.: 14/827,223

(22) Filed: Aug. 14, 2015

(65) Prior Publication Data

US 2016/0049262 A1    Feb. 18, 2016

Related U.S. Application Data

(60) Provisional application No. 62/070,108, filed on Aug. 14, 2014.

(51) Int. Cl.

| | | |
|---|---|---|
| H01G 11/48 | (2013.01) | |
| H01G 11/58 | (2013.01) | |
| H01M 4/60 | (2006.01) | |
| H01M 10/36 | (2010.01) | |

(52) U.S. Cl.
CPC ............ *H01G 11/48* (2013.01); *H01G 11/58* (2013.01); *H01M 4/60* (2013.01); *H01M 4/602* (2013.01); *H01M 10/36* (2013.01); H01M 2220/00 (2013.01); Y02E 60/13 (2013.01)

(58) Field of Classification Search
CPC ........................................................ H01M 4/60
See application file for complete search history.

(56) References Cited

U.S. PATENT DOCUMENTS

| | | | | |
|---|---|---|---|---|
| 4,504,557 A | * | 3/1985 | Filatovs .................. | H01M 4/60 252/182.1 |
| 2002/0064710 A1 | * | 5/2002 | Kawakami .............. | H01M 4/02 429/231.95 |
| 2009/0134007 A1 | * | 5/2009 | Solis Herrera ..... | H01M 14/005 204/157.5 |
| 2010/0185055 A1 | | 7/2010 | Robertson et al. | |

(Continued)

FOREIGN PATENT DOCUMENTS

WO    WO 2005026216 A1 *    3/2005    ................ C08J 5/18

OTHER PUBLICATIONS

Meredith P. et al., "Electronic and optoelectronic materials and devices inspired by nature," Rep Prog Phys 76(3):034501 (2013).
(Continued)

*Primary Examiner* — Sarah A. Slifka
*Assistant Examiner* — Brian R Ohara
(74) *Attorney, Agent, or Firm* — Fish & Richardson P.C.

(57) ABSTRACT

In one aspect, an energy storage device comprises one or more organic electrodes comprising one or more melanin-based energy storage materials and cations, with the one or more melanin-based energy storage materials reversibly binding the cations while the biocompatible energy storage device is in an inactive state, and the one or more melanin-based energy storage materials releasing the cations to provide energy while the energy storage device is in an active state.

20 Claims, 3 Drawing Sheets

(56) References Cited

U.S. PATENT DOCUMENTS

2010/0279209 A1* 11/2010 Jeong ............... H01M 8/0206
429/518

OTHER PUBLICATIONS

Irimia-Vladu M. et al., "Indigo—From Jeans to Semiconductors: Indigo—A Natural Pigment for High Performance Ambipolar Organic Field Effect Transistors and Circuits," Adv. Mater 24(3):321 (2012).

Irimia-Vladu M. et al., "Biocompatible and Biodegradable Materials for Organic Field-Effect Transistors," Adv. Funct. Mater, 20(23):4069-4076 (2010).

Hwang S-W et al., "Materials and Fabrication Processes for Transient and Bioresorbable High-Performance Electronics," Adv Funct. Mater (2013).

Bettinger CJ & Bao Z, "Organic Thin-Film Transistors Fabricated on Resorbable Biomaterial Substrates," Adv. Mater, 22(5):651-655.

Siegel AC, et al., "Foldable Printed Circuit Boards on Paper Substrates," Adv. Funct. Mater 20(1):28-35 (2009).

Bettinger CJ et al., "Biocompatibility of biodegradable semiconducting melanin films for nerve tissue engineering," Biomaterials 30(17):3050-3057 (2009).

Hwang S-W et al., "A Physically Transient Form of Silicon Electronics," Science 337(6102):1640-1644 (2012).

Kim D-H et al., "Epidermal Electronics," Science 333(6044):838-843 (2011.

Southcott M. et al., "A pacemaker powered by an implantable biofuel cell operating under conditions mimicking the human blood circulatory system—battery not included," Phys. Chem. Chem. Phys. 15(17):6278-6283 (2013).

Wei X & Liu J., "Power sources and electrical recharging strategies for implantable medical devices," Frontiers of Energy and Power Engineering in China 2(1):1-13 (2008).

Kerzenmacher S. et al., "An abiotically catalyzed glucose fuel cell for powering medical implants: Reconstructed manufacturing protocol and analysis of performance," J Power Sources 182(1):66-75.

Li Z et al., "Towards High Power High Energy Aqueous Sodium-Ion Batteries: The NaTi2(PO4)3/Na0.44MnO2 System," Adv. Energy Mater 3(3):290-294 (2013).

Wu W et al., "Microwave Synthesized NaTi2(PO4)3 as an Aqueous Sodium-Ion Negative Electrode," J Electrochem Soc 160(3):A497-A504 (2013).

Kim YJ et al., "Self-deployable current sources fabricated from edible materials," J. Mater Chem B 1(31):3781-3788 (2013).

Park Y et al., "Sodium Terephthalate as an Organic Anode Material for Sodium Ion Batteries," Adv Mater 24(26):3562-3567 (2012).

Armand M. et al., "Conjugated dicarboxylate anodes for Li-ion batteries," Nat Mater 8(2):120-125 (2009).

Renault S. et al., "Evaluation of polyketones with N-cyclic structure as electrode material for electrochemical energy storage: case of pyromellitic diimide dilithium salt," Chem Common (Cambridge, UK) 47(8):2414-2416 (2011).

Chen H. et al., "From Biomass to a Renewable LiXC6O6 Organic Electrode for Sustainable Li-Ion Batteries," ChemSusChem 1(4):348-355 (2008).

Reddy ALM et al., "Lithium storage mechanisms in purpurin based organic lithium ion battery electrodes," Sci Rep 2. (2012).

Kettlgruber G. et al., "Intrinsically stretchable and rechargeable batteries for self-powered stretchable electronics," J Mater Chem A 1(18):5505-5508 (2013).

Hu L et al., "Stretchable, Porous, and Conductive Energy Textiles," Nano Lett 10(2):718-714 (2010).

Gaikwad AM et al., "Highly Stretchable Alkaline Batteries Based on an Embedded Conductive Fabric," Adv Mater 24(37):5071-5076 (2012).

Wang C. et al., "Buckled, Stretchable Polypyrrole Electrodes for Battery Applications," Adv Mater, 23(31):3580-3584 (2011).

Sakaushi K. et al., "Aromatic porous-honeycomb electrodes for a sodium-organic energy storage device," Nat Commun 4:1485 (2013).

Gaikwad AM et al., "Highly Flexible, Printed Alkaline Batteries Based on Mesh-Embedded Electrodes," Adv Mater 23(29):3251-3255 (2011).

Chen Z et al., "High-Performance Sodium-Ion Pseudocapacitors Based on Hierarchically Porous Nanowire Composites," ACS Nano 6(5):4319-4327 (2012).

Mai L. et al., "Fast Ionic Diffusion-Enabled Nanoflake Electrode by Spontaneous Electrochemical Pre-Intercalation for High-Performance Supercapacitor," Sci Rep 3, (2013).

Palomares V. et al., "Na-ion batteries, recent advances and present challenges to become low cost energy storage systems," Energ Environ Sci. 5(3):5884-5901 (2012).

Yang L. et al., "Preparation of carbon coated MoO2 nanobelts and their high performance as anode materials for lithium ion batteries," J Mater Chem 22(26):13148-13152 (2012).

Kim, J. et al., "Discovery of Cellulose as a Smart Material," Macromolecules 39(12):4202-4206 (2006).

Milczarek G & Inganas O, "Renewable Cathode Materials from Biopolymer/Conjugated Polymer Interpenetrating Networks," Science 335(6075):1468-1471 (2012).

Yang C & Liu P (2009), "Water-Dispersed Conductive Polypyrroles Doped with Lignosulfonate and the Weak Temperature Dependence of Electrical Conductivity," Ind Eng. Chem Res. 48(21):9498-9503.

Li Z. et al. (2013), "Mesoporous nitrogen-rich carbons derived from protein for ultra-high capacity battery anodes and supercapacitors," Energ Environ Sci 6(3):871-878.

Wang L. et al. (2013), "Protein-inspired synthesis of $SnO_2$ nanocrystals with controlled carbon nanocoating as anode materials for lithium-ion battery," RSC Advances 3(5):1307-1310.

Ajayi FF & Weigele PR (2012), "A terracotta bio-battery," Bioresour Technol 116(0):86-91.

Whitacre JF et al. (2012), "An aqueous electrolyte, sodium ion functional, large format energy storage device for stationary applications," J Power Sources 213(0):255-264.

Mostert AB et al. (2012), "Role of semiconductivity and ion transport in the electrical conduction of melanin," PNAS.

d'Ischia M. et al. (2009), "Chemical and Structural Diversity in Eumelanins: Unexplored Bio-Optoelectronic Materials," Angew Chem Int Edit 48(22):3914-3921.

Meredith P & Sarna T. (2006), "The physical and chemical properties of eumelanin," Pigm Cell Res. 19(6):572-594.

Simon JD et al. (2009), "Current challenges in understanding melanogenesis: bridging chemistry, biological control, morphology, and function," Pigm Cell Melanoma R 22(5):563-579.

Hong L & Simon JD (2007), "Current Understanding of the Binding Sites, Capacity, Affinity, and Biological Significance of Metals in Melanin," J. Phys. Chem B. 111(28):7938-7947.

Hong L & Simon JD (2006), "Insight into the Binding of Divalent Cations to Sepia Eumelanin from IR Absorption Spectroscopy," Photochem Photobiol 82(5):12656-1269.

Eisenman H & Casadevall A (2012), "Synthesis and assembly of fungal melanin," Appl Microbiol Biotechnol 93(3):931-940.

Wakamatsu K. et al. (2012), "UVA-induced oxidative degradation of melanins: fission of indole moiety in eumelanin and conversion to benzothiazole moiety in pheomelanin," Pigm Cell Melanoma R 25(4):434-445.

Watt AAR et al. (2009), "The supramolecular structure of melanin," Soft Matter 5(19):3754-3760.

Meng S. & Kaxiras E (2008), "Theoretical Models of Eumelanin Protomolecules and their Optical Properties," Biophys J 94(6):2095-2105.

Sangaletti L. et al. (2009), "Polymerization effects and localized electronic states in condensed-phase eumelanin," Phys Rev B 80(17):174203.

Kaxiras E. et al. (2006), "Structural Model of Eumelanin," Phys Rev Lett 97(21):218102.

Chen C-T et al. (2013), "Self-Assembly of Tetramers of 5,6-Dihydroxyindole Explains the Primary Physical Properties of Eumelanin: Experiment, Simulation, and Design," ACS Nano 7(2):1524-1532.

(56) References Cited

OTHER PUBLICATIONS

Kim IG et al. (2011), "Electrochemical growth of synthetic melanin thin films by constant potential methods," Electrochim Acta 56(7):2954-2959.
Belitsky JM et al. (2012), "Small molecule modulators of aggregation in synthetic melanin polymerizations," Bioorg Med Chem Lett 22(17):5503-5507.
Povlich LK et al. (2010), "Poly(5,6-dimethoxyindole-2-carboxylic acid) (PDMICA): A Melanin-Like Polymer with Unique Electrochromic and Structural Properties," Macromolecules 43(8):3770-3774.
Wang H-g et al. (2013), "Nitrogen-Doped Porous Carbon Nanosheets as Low-Cost, High-Performance Anode Material for Sodium-Ion Batteries," ChemSusChem 6(1):56-60.
Collins J. et al. (2013), "Spectroscopic investigations of sequential nitric acid treatments on granulated activated carbon: Effects of surface oxygen groups on p density," Carbon 57(0):174-183.
Sing KSW et al. (1985), "Reporting physisorption data for gas/solid systems with special reference to the determination of surface area and porosity," Pure Appl Chem 57(4):603-619.
Holten-Andersen N. et al. (2011), "pH-induced metal-ligand cross-links inspired by mussel yield self-healing polymer networks with near-covalent elastic moduli," PNAS 108(7):2651-2655.
Hong L. et al. (2004), "Binding of Metal Ions to Melanin and Their Effects on the Aerobic Reactivity," Photochem Photobiol 80(3):477-481.
Najder-Kozdrowska L. et al., "Influence of Copper (II) Ions on Radicals in DOPA-Melanin," Appl Magn Reson 36(1):81-88 (2009).
Lindgren J. et al., "Molecular preservation of the pigment melanin in fossil melanosomes," Nat Commun 3:824 (2012).
Balazs DJ et al., "Inhibition of bacterial adhesion on PVC endotracheal tubes by RF-oxygen glow discharge, sodium hydroxide and silver nitrate treatments," Biomaterials 25(11):2139-2151 (2004).
Nethravathi C. et al., "Highly dispersed ultrafine Pt and PtRu nanoparticles on graphene: formation mechanism and electrocatalytic activity," Nanoscale 3(2):569-571 (2010).
Zhang K. et al., "Graphene/Polyaniline Nanofiber Composites as Supercapacitor Electrodes," Chem Mater 22(4):1392-1401.
Popa M. et al., "Synthesis and structural characteristics of nitrogen doped $TiO_2$ aerogels," Microporous Mesoporous Mater 132(1-2):80-86.
Capozzi V. et al., "Raman and optical spectroscopy of eumelanin films," J. Mol Struct 744-747(0):717-721 (2005).
Centeno SA & Shamir J, "Surface enhanced Raman scattering (SERS) and FTIR characterization of the sepia melanin pigment used in works of art," J. Mol Struct 873(1-3):149-159 (2008).
Suzuki S & Hibino H, "Characterization of doped single-wall carbon nanotubes by Raman spectroscopy," Carbon 49(7):2264-2272 (2011).
Glowacki ED et al., "Hydrogen-bonds in molecular solids—from biological systems to organic electronics," J Mater Chem B (2013).
Wei D. et al., "Graphene from electrochemical exfoliation and its direct applications in enhanced energy storage devices," Chem Commun (Cambridge, U K) 48(9):1239-1241.
Janoschka T. et al., "Powering up the Future: Radical Polymers for Battery Applications," Adv Mater 24(48):6397-6409 (2012).
Suga T. et al., "p- and n-Type Bipolar Redox-Active Radical Polymer: Toward Totally Organic Polymer-Based Rechargeable Devices with Variable Configuration," Adv Mater 23(6):751-754 (2011).
Moreau P. et al., "Structure and Stability of Sodium Intercalated Phases in Olivine $FePO_4$," Chem Mater 22(14):4126-4128 (2010).
Lee KT et al., "Topochemical Synthesis of Sodium Metal Phosphate Olivines for Sodium-Ion Batteries," Chem Mater 23(16):3593-3600 (2011).
Wessells CD et al., "Nickel Hexacyanoferrate Nanoparticle Electrodes for Aqueous Sodium and Potassium Ion Batteries," Nano Lett 11(12):5421-5425 (2011).
Chen H. et al., "Lithium Salt of Tetrahydroxybenzoquinone: Toward the Development of a Sustainable Li-Ion Battery," J Am Chem Soc 131(25):8984-8988 (2009).
Wang CY et al., "Polyaniline and polyaniline-carbon nanotube composite fibres as battery materials in ionic liquid electrolyte," J Power Sources 163(2):1105-1109 (2007).
Rudge A. et al., "Conducting polymers as active materials in electrochemical capacitors," J Power Sources 47(1-2):89-107 (1994).
Whitacre JF et al., "$Na_4Mn_9O_{18}$ as a positive electrode material for an aqueous electrolyte sodium-ion energy storage device," Electrochem Commun 12(3):463-466 (2010).
Lang X et al., "Nanoporous metal/oxide hybrid electrodes for electrochemical supercapacitors," Nat Nano 6(4):232-236 (2011).
Marsh H. & Reinoso FR (2006) Activated Carbon (Elsevier).
Hu B. et al., "Engineering Carbon Materials from the Hydrothermal Carbonization Process of Biomass," Adv Mater 22(7):813-828 (2010).
Cheng F. et al., "Functional Materials for Rechargeable Batteries," Adv Mater 23(15):1695-1715 (2011).
Bettinger CJ & Bao Z, "Organic Thin-Film Transistors Fabricated on Resorbable Biomaterial Substrates," Adv Mater 22(5):651-655 (2009).
Muskovich M & Bettinger CJ "Biomaterials-Based Electronics: Polymers and Interfaces for Biology and Medicine," Adv Healthcare Mater 1(3):248-266 (2012).
Slater MD et al., "Sodium-Ion Batteries," Adv Funct Mater 23(8):947-958 (2012).
Chun S-E et al., "Relating Precursor Pyrolysis Conditions and Aqueous Electrolyte Capacitive Energy Storage Properties for Activated Carbons Derived from Anhydrous Glucose-d," J Electrochem Soc 158(2):A83-A92 (2011).
Triggs NE & Valentini JJ "An investigation of hydrogen bonding in amides using Raman spectroscopy," The Journal of Physical Chemistry 96(17):6922-6931 (1992).
Liu Y & Simon JD "The Effect of Preparation Procedures on the Morphology of Melanin from the Ink Sac of Sepia officinalis," Pigment Cell Research 16(1):72-80 (2003).
Watt AAR et al., "The supramolecular structure of melanin," Soft Matter 5(19):3754-3760 (2009).
Povlich LK et al., "Poly(5,6-dimethoxyindole-2-carboxylic acid) (PDMICA): A Melanin-Like Polymer with Unique Electrochromic and Structural Properties," Macromolecules 43(8):3770-3774 (2010).
Sing KSW et al., "Reporting physisoiption data for gas/solid systems with special reference to the determination of surface area and porosity," Pure Appl Chem 57(4):603-619 (1985).
Jung DS et al., "Recycling rice husks for high-capacity lithium battery anodes," PNAS 110:12229-12234 (2013).
Bothma JP et al., "Device-Quality Electrically Conducting Melanin Thin Films," Adv Mater 20(18):3539-3542 (2008).
Deziderio SN et al., "Thin films of synthetic melanin," J Non-Cryst Solids 338-340:634-638 (2004).
Amatucci GC et al., "An Asymmetric Hybrid Nonaqueous Energy Storage Cell," J Electrochem Soc 148(8):A930-A939 (2001).

\* cited by examiner

MELANINS AS ACTIVE COMPONENTS IN ENERGY STORAGE MATERIALS

CROSS REFERENCE TO RELATED APPLICATIONS

This application claims the benefit of priority under 35 U.S.C. § 119(e) to provisional U.S. Patent Application No. 62/070,108, filed on Aug. 14, 2014, the entire contents of which are hereby incorporated by reference.

BACKGROUND

The present disclosure relates generally to energy storage devices, and specifically to biocompatible energy storage devices.

Biodegradable electronics represent an attractive and emerging paradigm in medical devices by harnessing simultaneous advantages afforded by electronically active systems and obviating issues with chronic implants. Biodegradable electronics devices have been fabricated using a variety of natural and synthetic materials. However, autonomous on-board power generation can pose a significant challenge. Existing power supply strategies include energy harvesting systems or external radiofrequency signals. Energy storage devices such as batteries and supercapacitors can be used for chronic implants such as pacemakers, neurostimulators, and cochlear implants. Although high-performance energy storage systems provide a viable solution for temporary implants, toxic electrode materials and organic electrolytes with poor biocompatibility may present technical and regulatory hurdles for implementation and clinical adoption of biodegradable implants.

SUMMARY

The present disclosure describes apparatus and methods relating to an energy storage device. The energy storage device may be a biocompatible energy storage device that uses organic electrodes composed of melanin pigments.

In one aspect of the present disclosure, an energy storage device comprises one or more organic electrodes comprising one or more melanin-based energy storage materials and cations, with the one or more melanin-based energy storage materials reversibly binding the cations while the biocompatible energy storage device is in an inactive state, and the one or more melanin-based energy storage materials releasing the cations to provide energy while the energy storage device is in an active state.

Implementations of the disclosure can include one or more of the following features. The one or more melanin-based energy storage materials has a charge storage capacity of at least 20 milliamp-hours per gram of the one or more melanin-based energy storage materials. The one or more melanin-based energy storage materials comprises at least one of a naturally-occurring melanin or a synthetic melanin. The naturally-occurring melanin comprises homogeneous nanoparticles that aggregate into mesoscale structures with short range order. The naturally-occurring melanin comprises at least one of 5,6-dihydroxyindole (DHI) or 5,6-dihydrosyindole-2-carboxylic acid (DHICA) polymers. The synthetic melanin comprises disordered extended heteroaromatic polymer networks with redox active groups. The synthetic melanin is prepared from oxidation of at least one of tyrosine, dopamine, a tyrosine derivative, or a dopamine derivative. The synthetic melanin is prepared from oxidative polymerization of 5,6-dimethoxyindole-2-carboxylic acid. The one or more melanin-based energy storage materials comprises moieties that bind the cations through formation of organometallic complexes. The cations comprise multivalent cations. The cations increase the thermal stability of the one or more melanin-based energy storage materials relative to a thermal stability of pristine melanin-based energy storage materials. The cations increase a peak cathodic current of the one or more melanin-based energy storage materials relative to a peak cathodic current of pristine melanin-based energy storage materials. The energy storage device may include an anode comprising the one or more melanin-based energy storage materials and a cathode comprising a metal oxide. The energy storage device may include an aqueous electrolyte that activates the energy storage device. The energy storage device provides power for at least four hours when operating at a discharge rate of 10 microamps per hour per 300 mg of the one or more melanin-based energy storage materials. The one or more melanin-based energy storage materials comprises at least one of a biochrome, a trichochrome, an eumelanin, a pheomelanin, or a neuromelanin.

In another aspect of the present disclosure, an edible, biodegradable electronic medical device comprises a biocompatible energy storage device that provides power to the edible, biodegradable electronic medical device. The biocompatible energy storage device comprises one or more naturally-occurring eumelanin pigments as an active component in one or more aqueous sodium ion energy storage materials, with the one or more naturally-occurring eumelanin pigments binding sodium ions while the biocompatible energy storage device is in an inactive state, and the one or more naturally-occurring eumelanin pigments releasing the sodium ions to provide power to the edible, biodegradable electronic medical device while the biocompatible energy storage device is in an active state.

The details of one or more implementations are set forth in the accompanying drawings and the description below. Other features, objects, and advantages will be apparent from the description, the drawings, and the claims.

DETAILED DESCRIPTION

Figure 1:
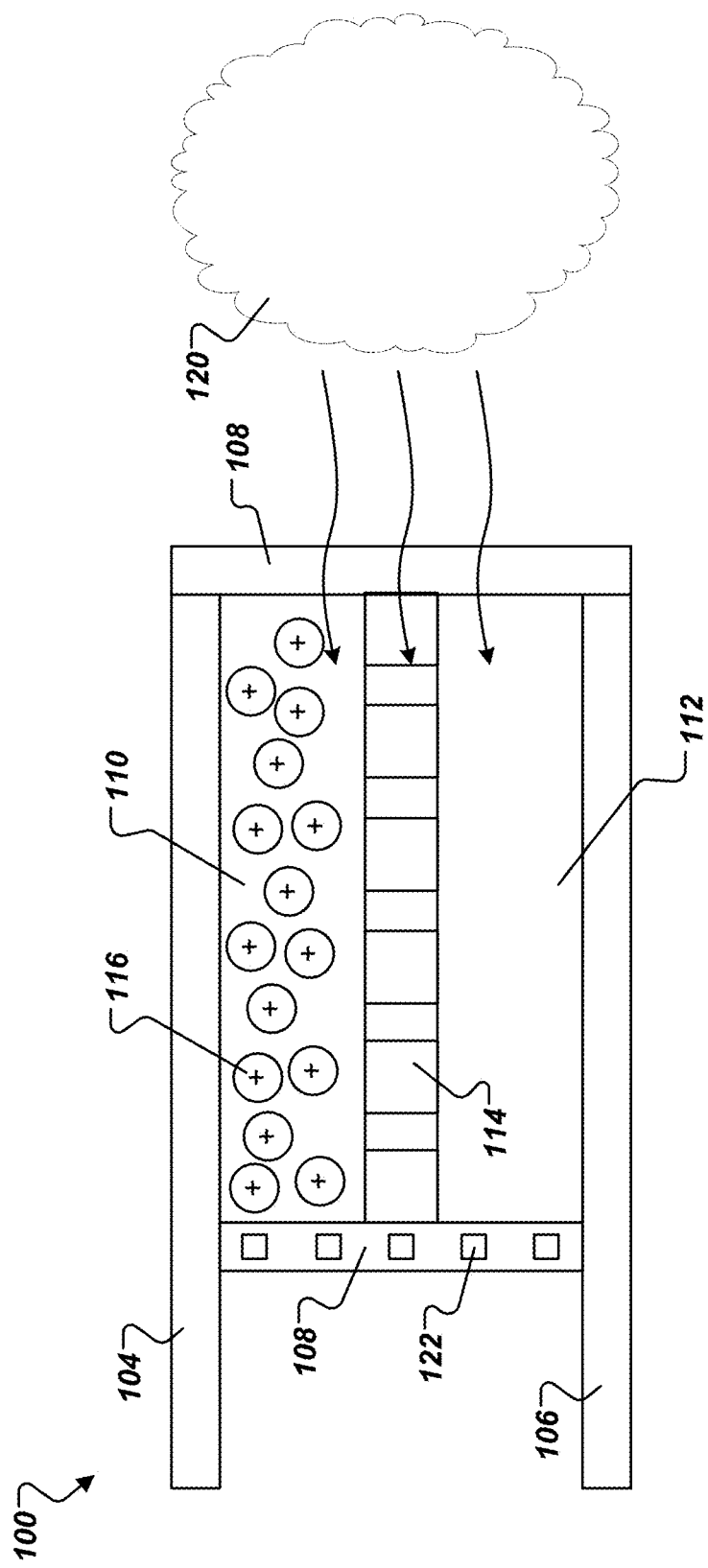
FIG. 1 shows an example of an energy storage device.

Aqueous sodium-ion energy storage devices combined with biocompatible electrodes may be used as components in energy storage devices to power next generation biodegradable electronics. The energy storage devices can provide onboard energy sources for a variety of temporary implantable and edible electronic medical devices. Examples of such applications can include powering edible gastric stimulators, edible biosensors, controlled release devices, and optoelectronic devices for optical sensing, gastric illumination, or photothermal ablation of tumors. The energy storage device can be used to power medical devices that can also be swallowed. The energy storage device may be directly integrated with the medical devices, or may be used to power the medical devices remotely or by tethered connection. Examples of medical devices that can be powered by the energy storage device include biosensors, imaging devices, and sources of light, heat, or electric current. The energy storage device can be used to trigger the controlled release of therapeutics, including small molecules and macromolecular biomolecules such as proteins, polysaccharides, DNA, and RNA, into the organism. A biocompatible energy storage device may be used to avoid chronic implantation risks associated with traditional implantable batteries, such as infection, chronic fibrosis, internal tissue or organ damage, and leakage of battery contents.

There are numerous examples of electrodes that use organic electrolytes for applications in high-density lithium-ion energy storage. Organic electrodes can be fabricated into nonconventional device formats that are curvilinear, flexible, and stretchable. Furthermore, organic electrodes can be prepared using biologically derived materials or biomass toward the goal of achieving sustainable energy storage material production. Carbonization of naturally derived materials can produce highly porous materials that exhibit suitable performance for use in primary batteries and supercapacitors. The organic electrode material may be biocompatible or biodegradable and exhibit physicochemical properties to support high charge storage densities. Electrodes may be prepared in a scalable and facile manner to maximize economic viability.

This disclosure describes organic electrodes composed of melanin pigments that can be used in biocompatible energy storage devices. Melanin pigments are promising biologically-derived anode materials to power transient electronics for use in biomedical applications. Melanins of natural and synthetic origin are composed of well-characterized monomers. Melanins, therefore, offer potential regulatory advantages for use in edible electronics compared to alternative exotic synthetic electrode materials, which carry unknown risks. The performance of melanin anodes is comparable to many commonly available synthetic organic electrode materials. A key advantage of melanin-based anodes is the ability to directly utilize naturally occurring biopolymers with limited post-processing. Previous examples of biologically-derived battery electrodes use polymeric biomaterials as templates that are functionalized by carbonization. However, melanin exhibits chemistry and microstructure that permit immediate use of the material as an organic electrode material in aqueous sodium-ion energy storage devices. When used in combination with other biocompatible cathodes, aqueous electrolytes, and sodium ions, melanins can be rapidly utilized as power supplies for edible or biodegradable electronic medical devices.

FIG. 1 shows an example of an energy storage device 100. The energy storage device 100 includes a cathodic lead 104, an anodic lead 106, an anode 110, a cathode 112, a separator 114, and cations 116. The cathodic lead 104, the anodic lead 106, the anode 110, the cathode 112, and the separator 114 may be arranged in a planar configuration to optimize power output.

The cathode 112 may include a biocompatible material. For example, the cathode 112 may include a melanin-based material. As another example, the cathode 112 may include a metal oxide with a decreased amount of toxicity, relative to an amount of toxicity of other metal oxides. The non-toxic metal oxide may be a manganese oxide ($MnO_2$). In such an implementation, a phase of the manganese oxide may be a $\lambda$-$MnO_2$. Other morphologies of manganese oxide may be included in the cathode 112, such as $\alpha$-$MnO_2$ and electrolytic manganese dioxide.

The anode 110 may include a melanin-based energy storage material. Melanins are a broad class of pigments found in many organisms and may include any oligomer or polymer that is derived from tyrosine, dopamine, and their derivatives. The resulting oligomer or polymer may contain at least an indole-based ring and a catechol group in a variety of topological configurations. For example, Melanins may be composed of disordered extended heteroaromatic polymer networks. Melanins of natural origin (e.g., derived from *Sepia officinalis*) and/or synthetic origin can be used as materials of the anode 110 or the cathode 112 in of the energy storage device 100. Natural melanins include melanins that are existing in or formed by nature. Synthetic melanins include melanin-based materials that are formed through a chemical process by human agency, as opposed to those of natural origin. Other suitable melanin-based materials, such as biochrome, trichochrome, eumelanin, pheomelanin, or neuromelanin, may be used as active components of the energy storage device 100.

The anode 110 is infused with functional, benign cations 116, such as sodium ($Na^+$) ions. Other suitable cations may include, for example, potassium or other benign cationic species that are naturally occurring in an organism. The cations 116 may be loaded via chemical or electrochemical means into the anode 110. The cations 116 serve as counterions during operation of the energy storage device 100.

The separator 114 between the anode 110 and the cathode 112 may include a fibrous cellulosic material. The cellulosic material may be pressed into a thin film. The separator 114 serves as a physical barrier between the anode 110 and the cathode 112.

The cathodic lead 104 and the anodic lead 106 conduct electrons from the reaction areas in the electrodes to an external circuit. The cathodic lead 104 is in contact with the cathode 112. The anodic lead 106 is in contact with the anode 110. The cathodic lead 104 may include a thin film of conducting material, such as a gold material, a graphite material, a carbon material, a conducting polymer, or a combination thereof. Similarly, the anodic lead 106 may include a thin film of conducting material, such as a gold material, a graphite material, a carbon material, a conducting polymer, or a combination thereof.

The components of the energy storage device 100 may be exposed to an aqueous environment to initiate operation of the energy storage device. The energy storage device 100 may be designed to activate at a predetermined time through the controlled presentation of an aqueous electrolyte 120. The aqueous environment may include an electrolyte 120 that diffuses into the anode 110 and the cathode 112 of the energy storage device 100. The electrolyte 120 may include sodium sulfate ($Na_2SO_4$).

In some implementations, the energy storage device 100 can be activated from the natural moisture of hydrated tissues in the GI tract of an organism or from an external source of water such as a bolus of water consumed by the organism. For example, the electrolyte 120 can be supplied through exogenous dosing such as consuming an aqueous solution of the electrolyte 120 by the organism. For example, the electrolyte 120 may be supplied by swallowing a 0.5 molarity (M) aqueous solution of sodium sulfate in coordination with ingestion of the energy storage device 100. The bolus of electrolyte 120 in the external environment will lead to diffusion of the electrolyte 120 across a polymer 108 of the casing and into the anode 110 and the cathode 112 to initiate operation of the energy storage device 100.

In some implementations, the electrolyte 120 may be loaded or embedded into reservoirs 122 within the polymer 108 of the outer casing. The electrolyte 120 may be solid electrolyte that dissolves when the energy storage device 100 is hydrated by an external environment. Hydrating the energy storage device 100 in a natural aqueous environment within the organism will lead to diffusion of the electrolyte 120 and transportation of the ions from the reservoirs 122 into the anode 110 and the cathode 112 to initiate operation of the energy storage device 100. The electrolyte 120 permeates the polymer 108 and leads to activation of the anode 110 and the cathode 112 of the energy storage device 100 to commence battery operation. In this context, active refers to the act of being functional as in the case of having an electronic load applied to the positive and negative leads of the energy storage device 100. Inactive refers to not discharging the energy stored in the energy storage device 100. When the energy storage device 100 is active, current is delivered across electrode leads 104 and 106 by migrating cations 116 infused in the anode 110 from the anode 110 to the cathode 112.

A subclass of melanins that can be used as active components in an energy storage device are eumelanins. Eumelanins are a subset of naturally-occurring melanin pigments that are composed of randomly polymerized tetramer units of 5,6-dihydroxyindole (DHI), 5,6-dihydroxyindole-2-carboxylic acid (DHICA), or both. Eumelanins mediate redox reactions and exhibit unique physical properties which are widely utilized in many important biological functions. Eumelanins exhibit unique chemical signatures that can support reversible cation binding including pendant catechols, carboxylates, and aromatic amines. Eumelanins exhibit excellent in vitro and in vivo biocompatibility along with biodegradability via free radical degradation mechanisms. Furthermore, eumelanins exhibit hydration-dependent hybrid electronic/ionic conduction through self-doping mechanisms and the ability to form homogeneous nanoparticles that spontaneously aggregate into mesoscale structures with short range order. These protomolecules utilize strong π-π stacking and hydrogen bonding interactions that promote self-assembly into spherical nanostructures with an intermolecular spacing of 3.8 Å and characteristic dimensions of 100-300 nm. Because of the unique chemical and physical properties of eumelanins, it can serve as a biologically-derived material for use as biocompatible electrodes in high density charge storage devices.

Synthetic melanins can be prepared from oxidative polymerization of L-3,4-dihydroxyphenylalanine (L-DOPA), dopamine, or indole derivatives. Although the chemical functionalities of natural eumelanins are conserved in synthetic melanins, the microstructure of synthetic melanins is markedly different. Synthetic melanins exhibit morphologies that are dominated by porous networks or dendritic structures as opposed to packed nanoparticle aggregates.

Figure 2:
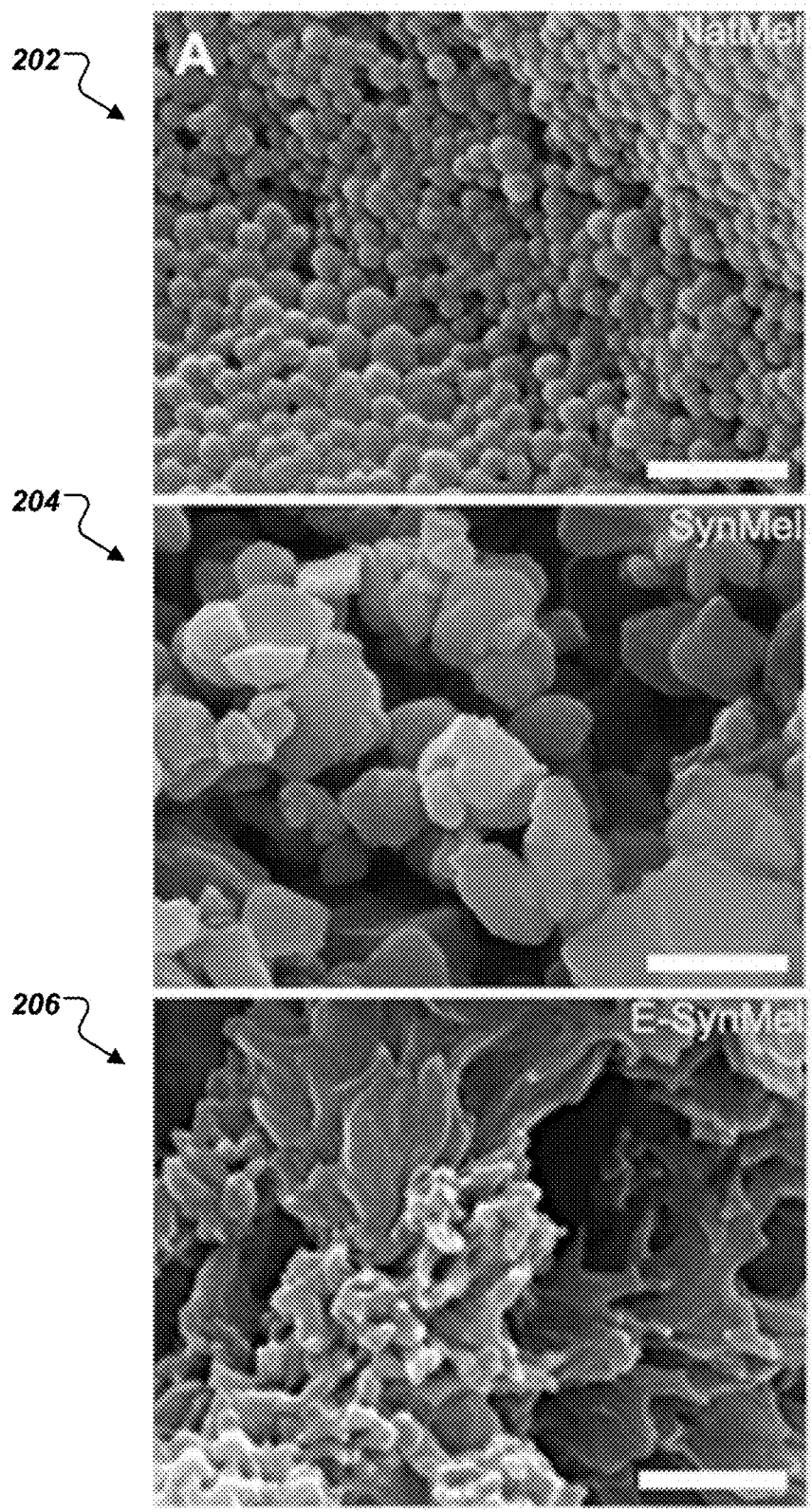
FIG. 2 shows scanning electron microscope (SEM) images of three classes of eumelanins.

Three classes of eumelanins that can be used in electrodes for sodium-ion energy storage devices include (1) naturally-occurring eumelanins isolated from *Sepia officinalis* (NatMel), (2) synthetic eumelanins prepared from auto-oxidation of tyrosine, dopamine, or their derivatives (SynMel), (3) synthetic melanin-like materials (E-SynMel) prepared from the oxidative polymerization of 5,6-dimethoxyindole-2-carboxylic acid (DMICA). As shown in FIG. 2, NatMel 202 consists of homogeneous nanoparticle aggregates while SynMel 204 and E-SynMel 206 exhibit heterogeneous nanostructures and rod-like microstructures, respectively.

NatMel, SynMel, and E-SynMel exhibit Brunauer-Emmett-Teller (BET) surface areas of 19.9, 10.7, and 9.2 $m^2/g$, respectively. The surface areas of these three classes of melanins are smaller than many other carbon-based electrode materials. SynMel and E-SynMel exhibit hysteresis in $N_2$ adsorption-desorption isotherms, which suggests that these materials have a mesoscale disorder. Conversely, NatMel exhibits higher specific surfaces areas and reduced hysteresis compared to SynMel and E-SynMel, which suggests that individual NatMel are composed of nanometer-scale textured granules. NatMel and E-SynMel contain smaller pore diameters with narrow distributions compared to SynMel. These quantitative measurements confirm the heterogeneous nanostructure of SynMel. Increased heterogeneity in SynMel arises as a consequence of the polymerization mechanism.

All three melanin compositions follow a Type IV behavior as characterized by the presence of a rounded knee at low values of $p/p_o$ and a small slope at intermediate values of $p/p_o$. These features correspond to the formation of mono layers and multilayers, respectively. The small values of absorbed volumes V at low normalized pressures $p/p_o$ for all melanin compositions suggest that there is limited surface area for monolayer adsorption. This observation is consistent with the calculated specific areas. Another notable feature for the BET measurements is the significant hysteresis observed in SynMel and E-SynMel, but not NatMel, which suggests that both SynMel and E-SynMel are composed of disordered networks, which is corroborated by SEM micrographs shown in FIG. 2.

The data produced from the Barrett-Joyner-Halenda (BJH) method offers additional insight into the different mesoporous structures of the three melanin compositions. NatMel is a natural pigment that can be isolated from *Sepia officinalis*. It is an extended heterogeneous biopolymer composed of DHI and DHICA, aromatic bicyclic monomers that are coupled to each other at the 2, 4, and 7 positions through a variety of permutations. DHI and DHICA precursors form tetramers that assemble into multilayers through strong π-π interactions. Furthermore, multilayers form concentric rings that build up to form isotropic homogeneous nanoparticles that agglomerate into larger superstructures. SynMel can be prepared from oxidative polymerization of L-tyrosine. The sequential oxidation of L-tyrosine first produces a quinone, followed by cyclization of the 5-member ring via Michael addition, and finally oxidative polymerization at the 2, 4, and 7 positions. E-SynMel can be prepared from oxidative polymerization of 5,6-dimethoxyindolecarboxylic acid (DMICA). Hence, both NatMel and E-SynMel can be prepared through oxidative polymerization of bicyclic aromatics at the 2 (in the case of NatMel without carboxylic acid groups), 4, and 7 positions. These compositions exhibit pore size distributions in which the dominant pore diameter is in the range of 3 to 4 nm. Therefore, these materials are classified as mesoporous. BET and BJH data suggest NatMel is composed of nanometer-scale textured granules.

Pore-size distributions at this length scale (<5 nm) confer increased charge storage capacities. The preparation of SynMel in oxidative environments is a two-step process that includes cyclization of L-tyrosine followed by polymerization. However, ring formation and oxidative polymerization may proceed concurrently, which may lead the incorporation of L-tyrosine at the 4 and 7 positions. Pendant primary amines may increase the porosity of the resulting network, which may explain the shift in the pore size distribution to larger diameters. These larger pore sizes may explain the reduced apparent sodium loading as measured by X-ray photoelectron spectroscopy (XPS) data. The smaller fraction of sodium (as measured by atomic %) may be an artifact that can be explained by sodium ion loading into pores that cannot be directly measured due to the small characteristic penetration depth of XPS. This measured value of sodium is much smaller than that of NatMel and E-SynMel, which are exclusively mesoporous materials as assessed by BJH.

Both XPS and Raman spectra confirm that there is a negligible amount of proteins present in the melanin anodes composed of biologically-derived materials. First, amide bonds should produce prominent peaks in the Raman spectra between wave numbers of 1630-1680 cm-1. These peaks would be associated with carbonyl stretches within amide bonds. However, these peaks are largely absent from Raman spectra recorded for NatMel, SynMel, and E-SynMel. Furthermore, incorporating this additional peak into the composite signal produced unsatisfactory fits. The presence of residual proteins should produce a sulfur peak (corresponding to cysteines) in the XPS survey spectrum at approximately 162-168 eV. However, this peak is absent in the spectra for these three classes of melanins.

The overall characteristics of the Raman spectra of pristine NatMel, SynMel, and E-SynMel are comparable to other $sp^2$-hybridized carbon materials. Deconvolution using a Voigt function reveals broad peaks between wavenumbers of 1000 and 1750 $cm^{-1}$ that are associated with vibrational signatures generated by indole groups. Peaks centered at 1590 and 1510 $cm^{-1}$ are attributed to stretching vibrations of aromatic C=C and C=N bonds in indole structure. The peak observed at 1418 $cm^{-1}$ is associated with stretching vibrations in pyrrole-like subunits. Two bands at lower wavenumber are observed at 1220 and 1341 $cm^{-1}$. These features correspond to C—OH and aromatic C—N groups from indoles, respectively.

Eumelanins contain moieties that can reversibly bind multivalent cations through the formation of organometallic complexes. Strategic selection of monomers used in SynMel and E-SynMel polymerization can permit the deconvolution of the relative contributions of chemical signatures as sodium cation binding sites in NatMel anodes. Catechol groups, present in both NatMel and SynMel, are redox active sites that reversibly bind cations. NatMel contain electronegative aromatic amines in DHI/DHICA monomers that also bind cations reversibly. Pendant carboxylates can also bind monovalent cations through Coloumbic interactions. Approximately 75% of the aromatic bicyclic monomers in NatMel contain a carboxylate at the 2 position as measured by XPS. NatMel contains DHI, which does not feature a 2-carboxylic acid group, while both SynMel and E-SynMel can be formed from monomers with carboxylates.

Figure 3:
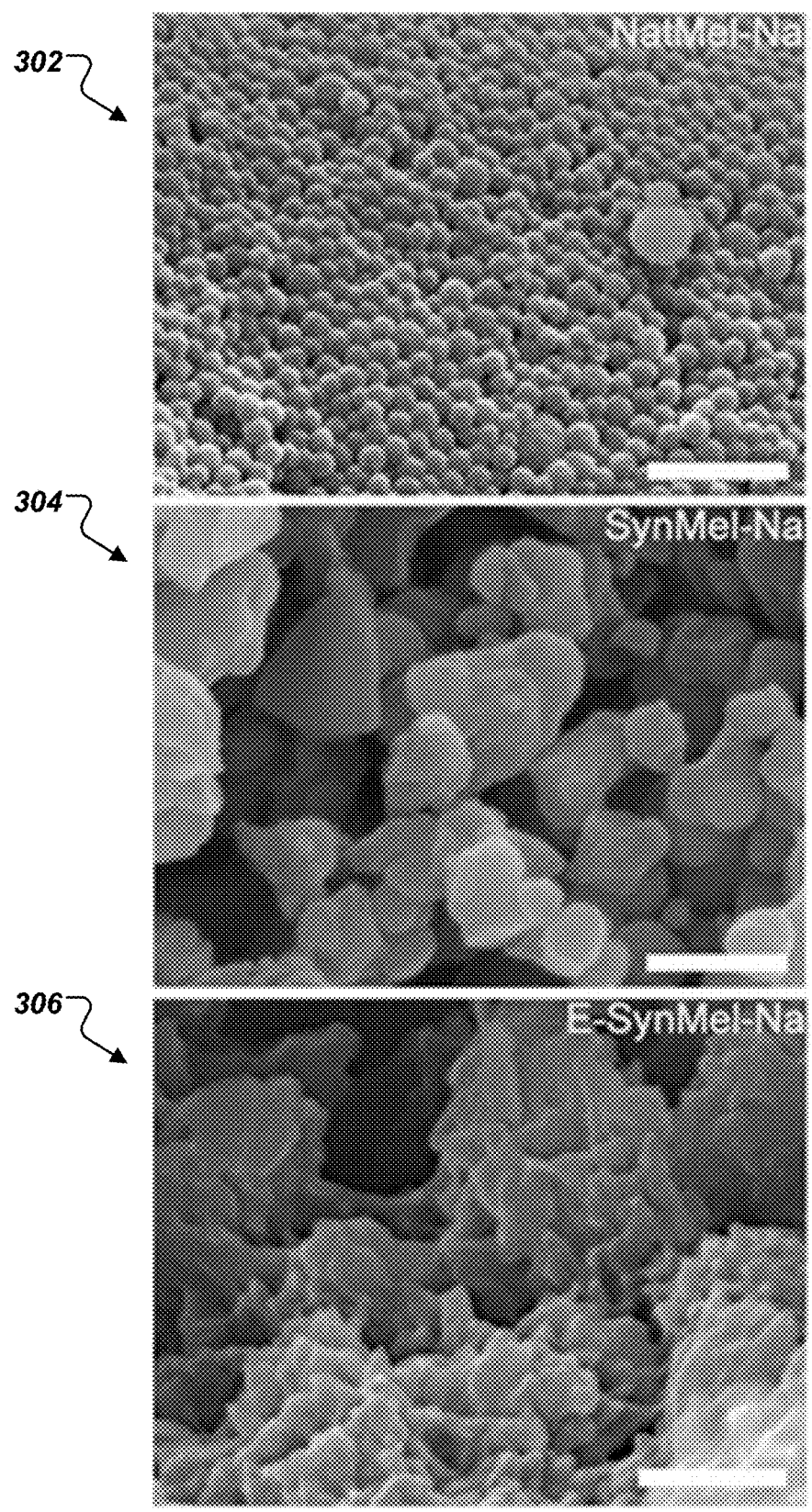
FIG. 3 shows SEM images of three classes of eumelanins loaded with sodium ($Na^+$) ions.

FIG. 3 shows SEM images of $Na^+$-loaded NatMel (Nat-Mel-Na) 302, $Na^+$-loaded SynMel (SynMel-Na) 304, and $Na^+$-loaded E-SynMel (E-SynMel-Na) 306. The location of sodium-ion loading within melanins can be assessed using XPS and Raman spectroscopy to obtain survey scan and high resolution spectra of the 1s orbitals of carbon (C), oxygen (O), and nitrogen (N). Peaks in the O (1s) region of the XPS spectra occurred at energies of 533.25, 531.92±0.2, and 530.79±0.3 eV, which are associated with COOH, C—OH, and C—O functionalities, respectively. $Na^+$-loaded melanins exhibit peaks at higher binding energies of 536.46 (NatMel-Na), 535.04 (SynMel-Na), and 535.28 (E-SynMel-Na) eV, which are associated with the formation of sodium carboxylate complexes (COO—Na). Two prominent peaks located near binding energies associated with N (1s) are observed at 399.00±0.3 and 397.50±0.4 eV. These peaks can be assigned to aromatic C—N and amine groups (N—H), respectively. Peaks centered about 397.50 eV exhibit a larger area under the curve after sodium cation loading. Similar increases in peak area were observed in nitrogen-doped titanium oxide at binding energies that are slightly smaller than 398 eV.

Significant peak shifts can be observed in the $Na^+$-loaded melanin materials. The presence of sodium cations influences the vibrational modes in melanin protomolecules relative to the complementary pristine anode materials. The largest peak shifts are associated with C—OH and C—N groups, which suggests strong coupling of sodium cations to carboxylic acids and aromatic amines. Similar peak shifts have been observed in boron- and nitrogen-doped single-walled carbon nanotubes and $TiO_2$ nanoparticles with organic coatings.

Sodium-ion loading on melanins can be confirmed through thermogravimetric analysis (TGA). Cations coordinate π-π stacking of melanin protomolecules and promote intermolecular hydrogen bonding. The TGA profiles of $Na^+$-loaded NatMel (NatMel-Na) indicate two nodes that occur at 480 and 590° C., which suggests the presence of two distinct populations of bound sodium cations. The slope of the plateau between these temperatures suggests that SynMel and E-SynMel are relatively more heterogeneous compared to NatMel. There are also more pronounced plateaus in weight loss between 480° C. and 590° C. for NatMel and E-SynMel compared to SynMel. This is likely due to the increased homogeneity of NatMel and E-SynMel compared to SynMel. $Na^+$-loaded melanins exhibit increased thermal stability compared to pristine melanins for a given composition, which suggests that cationic species generally stabilize melanin monomers. Thermograms of E-SynMel-Na indicate accelerated mass loss at temperatures above 700° C. compared to pristine E-SynMel, which suggests that the presence of aryl methoxy groups in E-SynMel may disrupt intermolecular hydrogen bonding and reduce the potential contribution of cationic stabilization and coordination after sodium loading.

The electrochemical performance of melanins anodes can be characterized by cyclic voltammetry (CV) and galvanostatic half-cell discharge cycles. $Na^+$-loaded melanins exhibit higher peak cathodic currents compared to pristine anodes for the three melanin compositions described above. Additionally, the $Na^+$-loaded melanins exhibit peak cathodic currents at potentials between 0-0.2 V (versus a mercurous sulfate electrode (MSE)). The redox reactions measured by CV during sodium-ion discharge are irreversible, which suggests that melanin anodes are suitable for primary energy storage materials. This operational constraint is fully compatible with applications in biodegradable and edible medical devices.

The rate of sodium-ion discharge from melanin anodes can be measured using galvanostatic half-cell measurements in aqueous environments with platinum counter electrodes (versus MSE). Half-cell discharge measurements can be initiated from their open circuit potentials (OCV) and monitored continuously thereafter. The OCVs of NatMel, SynMel, and E-SynMel are −0.38±0.02, −0.31±0.04, and −0.13±0.04 V, respectively. After sodium cation loading, the OCVs are reduced to −0.73±0.04, −0.73±0.06, and −0.43±0.06 V for NatMel-Na, SynMel-Na, and E-SynMel-Na, respectively. The OCVs of anodes composed of NatMel-Na and SynMel-Na anodes are more negative compared to anodes composed of activated carbon ($OCV_{AC}$=−0.3 V) and n-type redox polymers ($OCV_{n-poly}$=−0.6 V). Half-cell discharge profiles of $Na^+$-loaded melanin anodes exhibit plateaus in potentials between 0-0.2 V. This consistent feature corresponds to the sodium ion extraction. The measurements are in concert with the potential during peak cathodic current as measured by CV. Half-cells composed of E-SynMel-Na electrodes exhibit a gradual linear increase in potential (more positive) with a more compressed plateau compared to cells with NatMel and SynMel electrodes. Charge storage capacities measured using a constant discharge rate of 10 mA/g are 30.4±1.6, 31.1±2.0, and 24.1±2.0 mA/g for NatMel-Na, SynMel-Na, and E-SynMel-Na, respectively. Melanin anodes without sodium ions exhibit negligible charge storage capacity. The charge storage capacities of NatMel anodes are comparable to electrodes composed of polyaniline-carbon nanotube composites (12.1 mAh/g) or PPy/carbon fiber electrodes (23.9 mAh/g) and slightly lower compared to the capacities of poly(galvinoxylstyrene) electrodes (42 mAh/g).

Full cells can be prepared using melanin anodes and $\lambda$-$MnO_2$ cathodes. The initial full cell potentials of NatMel-Na and SynMel-Na are 1.0 V. E-SynMel-Na exhibits a slightly lower potential of 0.7 V due to the higher (more positive) OCV (−0.43 V). The full cell potentials of 1.0 V are comparable to other aqueous sodium-ion batteries. Galvanostatic discharge profiles can be measured using −10 µA. The specific capacities (normalized by anode mass) calculated from discharge profiles of full cells are 16.1±0.8, 12.4±1.2, and 7.9±1.4 mAh/g (n=5) for NatMel-Na, SynMel-Na, and E-SynMel-Na, respectively.

The specific capacities of $Na^+$-loaded melanin anodes in full cells are approximately ten times higher than corresponding unloaded melanin anodes. Full cell discharge profiles can be measured as a function of the $Na^+$-loaded melanin anode mass (between 3-21 mg) for a constant $\lambda$-$MnO_2$ cathode mass (8 mg). Specific capacities of $\lambda$-$MnO_2$ cathodes and $Na^+$-loaded melanin anodes are approximately 80 and 30 mAh/g, respectively, as measured by half-cell discharge experiments. The maximum amount of melanin (21 mg) exhibits a theoretical 1:1 ratio of anode/cathode capacity, which indicates that the full cell system is anode-limited. Full cells composed of $\lambda$-$MnO_2$ cathodes and $Na^+$-loaded melanin anodes exhibit a specific capacity of 7-16 mAh/g (normalized by anode mass) over a potential range of 1.0 V. These specific capacities are comparable to other exotic anode materials used in sodium-ion charge storage materials, and are lower than the best performing materials studied for traditional battery applications. However, the envisioned biomedical applications that will be enabled by melanin-based energy storage materials have modest specific capacity requirements.

NatMel-Na anodes exhibit a specific capacity that is 50% larger than SynMel-Na anodes. Natural melanin anodes may exhibit higher specific capacities compared to the specific capacities of synthetic melanins due to a combination of beneficial chemical, electrical, and physical properties exhibited by the former. Two characteristic features likely contribute to the increase of charge storage capacity of melanin-based anodes in the full cell system: the presence of pendant carboxylates and the larger surface area. The specific capacities normalized by surface area as measured by BET analysis are 0.79, 1.03, and 0.77 mAh/m² for NatMel-Na, SynMel-Na, and E-SynMel-Na, respectively, which highlight the advantageous chemistry of SynMel-Na anodes. Raman spectra further implicate pendant carboxylates as the primary moiety that increases the specific charge storage capacity of SynMel-Na compared to NatMel-Na.

The lifetime of a typical melanin/$\lambda$-$MnO_2$ full cell can be 5 hours when operating at discharge rates of 10 µA per 300 mg of active electrode material, which is more than one order of magnitude longer than power supplies that are currently used for ingestible event monitoring devices. However, one of the prospective limitations of melanin-based anodes in energy storage devices is the relatively low energy density compared to inorganic electrode materials. The performance of melanin anodes in full cells may be further improved by altering the chemical functionality of protomolecules and increasing the surface area through microstructure engineering to maximize the specific sodium-ion loading capacity. These design criteria can be achieved by designing biomimetic materials to control in vitro melanogenesis. Cathodes with higher specific mass densities can also increase the charge storage capacity of full cells.

Electrodeposition of E-SynMel can be performed by constant current application into conducting substrates in DMICA/acetone solution. Briefly, DMICA (0.01 M) can be electrochemically deposited on stainless steels with two electrode set-up using a constant current source with a platinum mesh counter electrode. E-SynMel can be synthesized by depositing DMICA in acetone with tetrabutylammonium percholate as counter ions. E-SynMel can be deposited using a constant current of 0.4 mA/cm² for 40 minutes followed by rinsing with acetone. E-SynMel can be harvested by mechanical delamination.

Sodium-ion loading can be performed by adding pristine melanin (300 mg) to solutions of sodium hydroxide (500 mg, 12.5 mmol) in ethanol (10 ml) at room temperature for 24 hours. Excess ethanol (~30 ml) can be added to remove unreacted sodium ions. The product can be centrifuged to precipitate out the $Na^+$-loaded melanin while discarding the supernatant. The washing procedure can be performed twice for a total of two washes. The precipitate can be dried at 100° C. for 1 hour in a vacuum oven and stored at ambient conditions.

Melanin electrodes can be prepared by combining melanin (300 mg) with polytetrafluoroethylene as a binder in a mass ratio of 75:25. The components of the electrodes can be homogeneously blended using agate mortar and pestle. $\lambda$-$MnO_2$ cathodes can be prepared by synthesizing $LiMn_2O_4$ followed by chemical dilithiation. $Li_2CO_3$ can be ball milled with electrolytic manganese dioxide in a stoichiometric molar ratio for 60-120 minutes. This mixture can be pyrolyzed at 750-800° C. in air for 8-12 hours. The resultant $LiMn_2O_4$ powder can be converted to cubic spinel $\lambda$-$Mn_2O_4$ via acid leaching. Briefly, $LiMn_2O_4$ powder can be stirred in 200 ml of 1 M $H_2SO_4$ solution for 24 hours. $\lambda$-$MnO_2$ electrodes can be prepared by mixing $\lambda$-$MnO_2$, PTFE, and acetylene black as conductive additive in a mass ratio of 80:10:10. Electrodes dedicated for electrochemical characterization (melanin=between 3 and 21 mg, $\lambda$-$MnO_2$=8 mg) can be pressed into stainless steel mesh handling structures. Discharge lifetimes can be measured by monitoring full cell potentials over time and estimated from charge balances. A three-electrode cell can be configured with melanin as working electrode against platinum counter electrode and $Hg/Hg_2SO_4$ (MSE) reference electrode. Multichannel potentiostat/galvanostat can be used to investigate cyclic voltammetry (CV) and galvanostatic discharge profiles. The apparent (nominal) surface area for disc electrodes are 28.3 mm² using a loading of 10 mg/m². BET surface area can be used for charge storage capacity calculations normalized by area.

Activated carbon (AC) is a suitable material to benchmark the performance of melanin-based anodes as charge storage materials. Aqueous-based supercapacitors that use AC electrodes exhibit specific capacitances of 100-200 F/g, which correspond to capacities of 25-55 mAh/g operating at 1 V. Namely, AC can deliver about 30 mAh/g if used in a neutral alkaline solution. Even though the mass-normalized capacity of melanin (10 m²/g) is smaller than AC (2000 m²/g), melanin anodes exhibit higher capacity with respect to the real surface area based on faradaic (charge transfer) reactions. Na$^+$-loaded melanin anodes may exhibit specific capacities of 30.4±1.6 mAh/g. Full cells composed of natural melanin anodes and λ-MnO$_2$ cathodes may exhibit an initial potential of 1.03±0.06 V with a maximum specific capacity of 16.1±0.8 mAh/g.

A number of implementations have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the describe apparatus and systems. Accordingly, other embodiments are within the scope of the following claims.

What is claimed is:

1. An energy storage device comprising:
one or more organic electrodes comprising one or more melanin-based energy storage materials and cations, with at least one of the one or more melanin-based energy storage materials comprising a melanin infused with one or more of the cations, with the one or more melanin-based energy storage materials reversibly binding the cations while the energy storage device is in an inactive state, and the one or more melanin-based energy storage materials releasing the cations to provide energy while the energy storage device is in an active state, the energy storage device being biocompatible.

2. The energy storage device of claim 1, wherein the one or more melanin-based energy storage materials has a charge storage capacity of at least 20 milliamp-hours per gram of the one or more melanin-based energy storage materials.

3. The energy storage device of claim 1, wherein the one or more melanin-based energy storage materials comprises at least one of a naturally-occurring melanin or a synthetic melanin.

4. The energy storage device of claim 3, wherein the naturally-occurring melanin comprises homogeneous nanoparticles that aggregate into mesoscale structures with short range order.

5. The energy storage device of claim 3, wherein the naturally-occurring melanin comprises at least one of 5,6-dihydroxyindole (DHI) or 5,6-dihydrosyindole-2-carboxylic acid (DHICA) polymers.

6. The energy storage device of claim 3, wherein the synthetic melanin comprises disordered extended heteroaromatic polymer networks with redox active groups.

7. The energy storage device of claim 3, wherein the synthetic melanin is prepared from oxidation of at least one of tyrosine, dopamine, a tyrosine derivative, or a dopamine derivative.

8. The energy storage device of claim 3, wherein the synthetic melanin is prepared from oxidative polymerization of 5,6-dimethoxyindole-2-carboxylic acid.

9. The energy storage device of claim 1, wherein the one or more melanin-based energy storage materials comprises moieties that bind the cations through formation of organometallic complexes.

10. The energy storage device of claim 1, wherein the cations comprise multivalent cations.

11. The energy storage device of claim 1, wherein the cations increase the thermal stability of the one or more melanin-based energy storage materials relative to a thermal stability of pristine melanin-based energy storage materials.

12. The energy storage device of claim 1, wherein the cations increase a peak cathodic current of the one or more melanin-based energy storage materials relative to a peak cathodic current of pristine melanin-based energy storage materials.

13. The energy storage device of claim 1, further comprising an anode comprising the one or more melanin-based energy storage materials and a cathode comprising a metal oxide.

14. The energy storage device of claim 1, further comprising:
an aqueous electrolyte that activates the energy storage device.

15. The energy storage device of claim 1, wherein the energy storage device provides power for at least four hours when operating at a discharge rate of 10 microamps per hour per 300 mg of the one or more melanin-based energy storage materials.

16. The energy storage device of claim 1, wherein the one or more melanin-based energy storage materials comprises at least one of a biochrome, a trichochrome, an eumelanin, a pheomelanin, or a neuromelanin.

17. An edible, biodegradable electronic medical device comprising:
a biocompatible energy storage device that provides power to the edible, biodegradable electronic medical device, the biocompatible energy storage device comprising:
one or more naturally-occurring eumelanin pigments as an active component in one or more aqueous sodium ion energy storage materials, with the one or more naturally-occurring eumelanin pigments binding sodium ions while the biocompatible energy storage device is in an inactive state, and the one or more naturally-occurring eumelanin pigments releasing the sodium ions to provide power to the edible, biodegradable electronic medical device while the biocompatible energy storage device is in an active state.

18. The edible, biodegradable electronic medical device of claim 17, wherein the naturally-occurring eumelanin pigments comprise homogeneous nanoparticles that aggregate into mesoscale structures with short range order.

19. The edible, biodegradable electronic medical device of claim 17, wherein the naturally-occurring eumelanin pigments comprise at least one of 5,6-dihydroxyindole (DHI) or 5,6-dihydrosyindole-2-carboxylic acid (DHICA) polymers.

20. The edible, biodegradable electronic medical device of claim 17, wherein the naturally-occurring eumelanin pigments comprise moieties that bind the cations through formation of organometallic complexes.

* * * * *

UNITED STATES PATENT AND TRADEMARK OFFICE
CERTIFICATE OF CORRECTION

PATENT NO. : 9,928,968 B2
APPLICATION NO. : 14/827223
DATED : March 27, 2018
INVENTOR(S) : Christopher J. Bettinger, Jay Whitacre and Young Jo Kim It is certified that error appears in the above-identified patent and that said Letters Patent is hereby corrected as shown below:

Column 11, Line 46, Claim 5, delete "dihydrosyindole-" and insert -- dihydroxyindole- --

Column 12, Line 56, Claim 19, delete "dihydrosyindole-" and insert -- dihydroxyindole- --

Signed and Sealed this
Twenty-second Day of May, 2018

Andrei Iancu
*Director of the United States Patent and Trademark Office*